Jan. 10, 1967 B. W. ROSE ETAL 3,296,641
EGG WASHER
Original Filed Sept. 28, 1962 2 Sheets-Sheet 1

INVENTORS
BOYD W. ROSE
HAROLD J. MUMMA
BY Hans G. Hofmeister
ATTORNEY

Jan. 10, 1967   B. W. ROSE ETAL   3,296,641
EGG WASHER
Original Filed Sept. 28, 1962   2 Sheets-Sheet 2
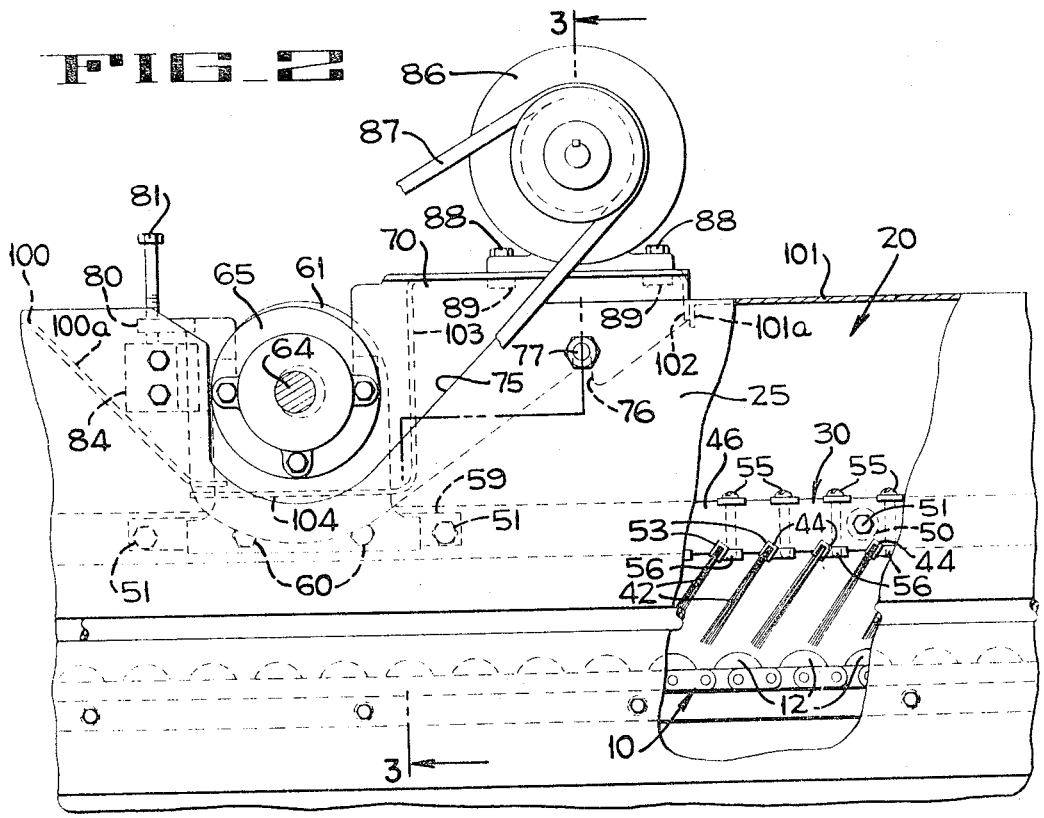
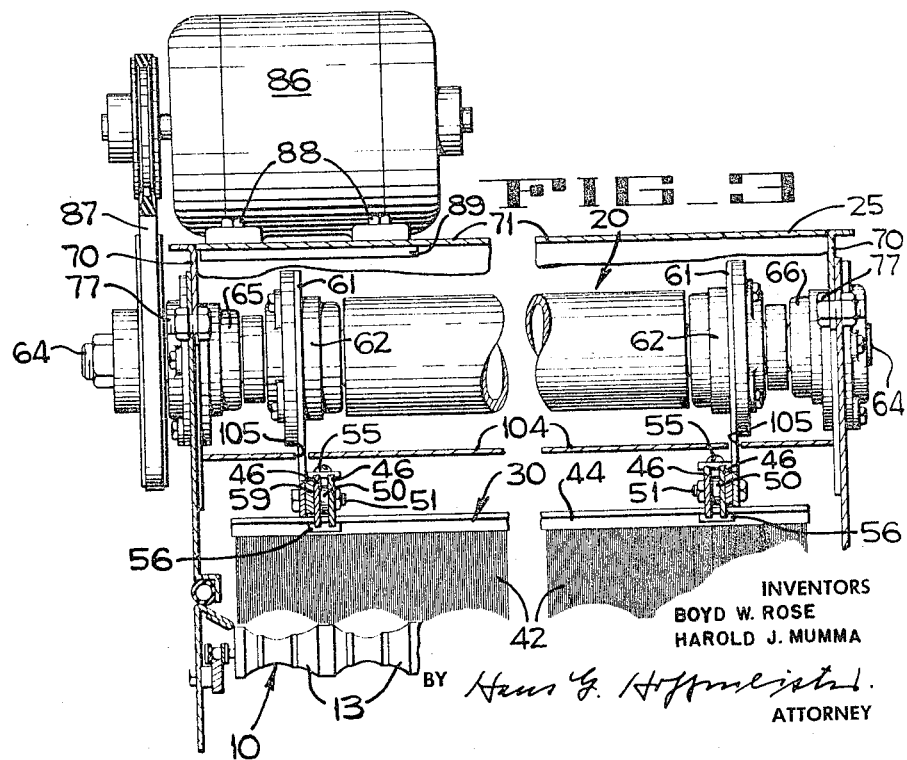
INVENTORS
BOYD W. ROSE
HAROLD J. MUMMA
BY Hans G. Hoffmeister
ATTORNEY United States Patent Office 3,296,641
Patented Jan. 10, 1967

3,296,641
EGG WASHER
Boyd W. Rose and Harold J. Mumma, Riverside, Calif., assignors to FMC Corporation, San Jose, Calif., a corporation of Delaware
Original application Sept. 28, 1962, Ser. No. 226,994, now Patent No. 3,252,607. Divided and this application Oct. 13, 1965, Ser. No. 495,542
1 Claim. (Cl. 15—3.13)

This application is a division of application Ser. No. 226,994 filed September 28, 1962, now Patent No. 3,252,607.

This invention relates to egg handling equipment and more particularly concerns apparatus for washing eggs.

An object of the present invention is to provide an improved egg washer.

Another object is to provide an improved drive mechanism for an egg washer.

Another object is to provide an efficient adjustment mechanism for brush units of a washer.

Other and further objects and features of the present invention will be apparent from the following description taken in connection with the accompanying drawings, in which:

FIGURE 2 is an enlarged diagrammatic side elevation of a portion of the washer of FIG. 1, parts being broken away to disclose the operating mechanisms.

FIGURE 3 is a vertical section taken along line 3—3 of FIG. 2.

Figure 1:
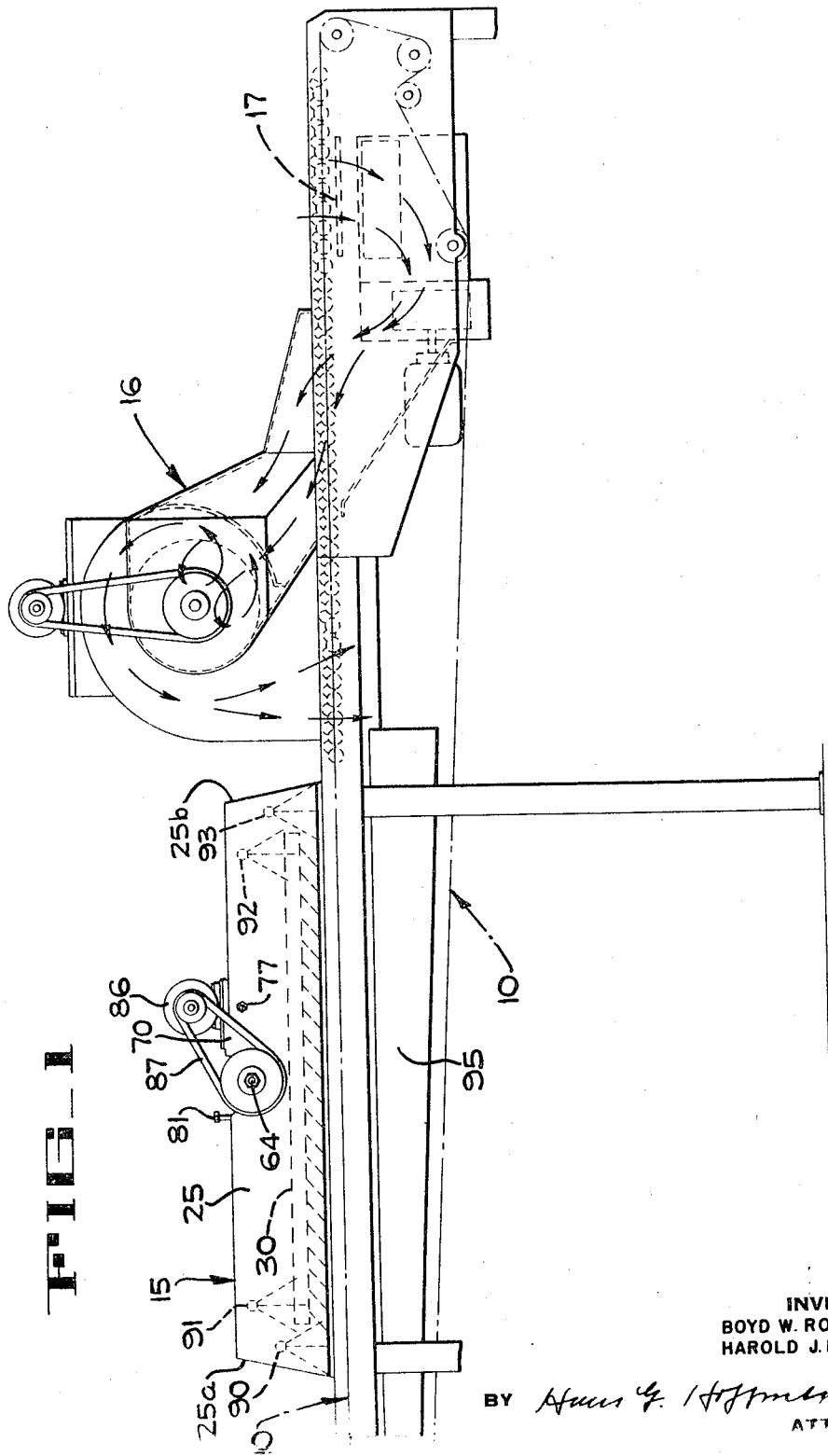
FIGURE 1 is a diagrammatic side elevation of the washing apparatus of the present invention, shown associated with a drying apparatus.

In the machine disclosed in the above-mentioned parent application, which is incorporated by reference herein, eggs are automatically assembled on an endless roller conveyor 10 which is provided with a plurality of transverse rows (FIG. 2) of rotatable rollers 12 (FIG. 3). Each roller has several longitudinally aligned roller sections 13, of conventional hour-glass configuration, which cooperate with adjacent leading and trailing roller sections to define pockets in which eggs are supported and rotated about their long axis which extends transversely of the conveyor. The upper run of the conveyor 10 moves from left to right (FIG. 1) and carries the eggs through the washer 15 of the present invention and then through a drier 16 and over a candling light 17.

The washer 15 comprises a sheet metal housing 25 (FIG. 1) which has an opening (not shown) at its forward end 25a adapted to permit the entry of the upper run of the roller conveyor 10, and a similar opening (not shown) at its rearward end 25b through which the conveyor 10 passes. A brush assembly 30 is mounted in the housing 25 for movement in an orbital path such that the lower ends of the bristles of the brushes move downwardly to engage and wipe across the eggs on the rollers and then are moved upwardly away from the eggs.

The brush assembly comprises a plurality of bristle units 42 (FIG. 2) each of which includes an elongate channel shaped holder 44 that is clamped in a carrier mechanism comprising two pair of spaced elongate support bars 46 (FIG. 3). Each pair of bars 46 is held in spaced relation by a plurality of spacers 50 and bolts 51 locking the bars on the spacers. Each channel shaped bristle holder 44 fits into a pair of identical recesses 53 (only one being shown) in the lower edges of the bars 46, and a bolt 55, which extends down between the adjacent bars 46, engages a special nut 56 and draws it up against the channel to lock the channel in place.

Each pair of the two pairs of elongate support bars 46 is secured by certain of the bolts 51 to a short bar 59 (FIG. 2) which in turn is secured by bolts 60 to the lower end of an actuator plate 61. Near its upper end each plate 61 is bolted to a bearing 62 (FIG. 3) that receives the eccentric throw of a shaft 64, the concentric portion of which is journalled for rotation in bearing units 65 and 66. Each of the bearing units 65 and 66 is bolted to a support plate 70, and the upper ends of the two support plates are connected by a transverse plate 71. Each plate 70 is positioned adjacent a cut-out portion 75 (FIG. 2) in one of the two side walls of the washer housing, and each plate has a notch 76 formed near its right hand end (FIG. 2) to receive the shank of a bolt 77 therein. A tab 80 is secured to the left hand end of each plate 70 and an adjusting screw 81, that is threaded through the tab, bears against an abutment plate 84 secured to the inner face of the adjacent side wall of the housing. When the bolts 77 are tightened up, the two plates 70 are locked to the housing. If it is necessary to adjust the height of the brushes, the bolts 77 are loosened and the adjusting screws 81 are actuated to pivot the plates 70 and the brush unit supported thereby about an axis defined by the two aligned bolts 77. The drive shaft 64 is driven by a motor 86 by a belt and pulley drive mechanism 87. The motor is secured by capscrews 88 to the transverse plate 71 and to a pair of stiffening bars 89 disposed beneath plate 71.

As the eggs enter the washer they receive a pre-soaking spray of fresh water containing a wetting agent by means of a transverse spray pipe 90 (FIG. 1). After the presoak, the eggs progress into the washing section where sprays from transverse spray pipes 91 and 92 and the orbital brushes combine to remove surface dirt from the eggs. As the eggs leave the brushing area they receive a momentary hot water rinse by means of a spray pipe 93. The several spray pipes are connected to conventional sources of pressurized hot or cold water as desired, and a trough 95 is provided below the washer to direct the wash water to a suitable drain.

A feature of the present invention is the arrangement of the upper wall of the housing so that the drive shaft 64 and the bearings in which it is journalled are completely isolated from the water vapor rising from the washer. As a result, the bearings have an exceptionally long life for bearings of an egg washer installation. It will be noted in FIG. 2 that the cover of the housing 25 is made in two sections; a forward section 100 which terminates in an inclined section 100a and a rearward section 101 that terminates in a depending flange 101a. In accordance with the present invention, the plate 71 on which motor 86 is mounted is provided with a rearward depending flange 102 that abuts the flange 101a and is provided with a forward vertical flange 103 which has a generally horizontal forwardly extending portion 104 that underlies the drive shaft 64 and the rearward edge of the forward cover section 100a. Slots 105 (FIG. 3) are provided in the horizontal cover portion 104 to permit the orbital movement of the actuator plates 61 of the eccentric drive mechanism. It, therefore, is apparent that the drive unit is cut-off from the moist interior of the washer.

Having thus described the invention what we claim as new and desire to protect by Letters Patent is:

In an egg processing machine, a washer having a housing defining an egg washing chamber, a conveyor movable through said housing to carry a plurality of eggs through said washing chamber, means for subjecting eggs on said conveyor to cleaning fluid in said chamber, a support frame having a first portion pivotally mounted on the upper end of said housing, a plurality of bristle units mounted on said frame for movement relative thereto along a predetermined path in said chamber closely adjacent the conveying surface of said conveyor to engage eggs on said conveyor, a drive unit mounted in said frame and connected to said brush units for moving said units along said path, and adjusting means supporting a portion of said frame that is spaced from said first portion, actuation of said adjusting means being effective to pivot said frame and raise or lower said brush units relative to said conveying surface.

References Cited by the Examiner

UNITED STATES PATENTS

| | | | |
|---|---|---|---|
| 2,392,540 | 1/1946 | Lyman | 134—181 |
| 2,412,565 | 12/1946 | Davis | 15—3.17 X |
| 2,979,746 | 4/1961 | Willsey | 15—3.13 |
| 3,097,382 | 7/1963 | Angle | 15—3.13 |
| 3,099,848 | 8/1963 | Mountz | 15—3.14 |

CHARLES A. WILLMUTH, *Primary Examiner.*

E. L. ROBERTS, *Assistant Examiner.*